United States Patent [19]

Kitagawa

[11] 4,298,261

[45] Nov. 3, 1981

[54] CAMERA AUTOMATICALLY SYNCHRONIZED WITH AN ELECTRONIC FLASH

[75] Inventor: Masahiro Kitagawa, Hachioji, Japan

[73] Assignee: Olympus Optical Company Ltd., Tokyo, Japan

[21] Appl. No.: 82,793

[22] Filed: Oct. 9, 1979

[30] Foreign Application Priority Data

Oct. 13, 1978 [JP] Japan .................................. 53-125874

[51] Int. Cl.³ ............................................. G03B 15/03
[52] U.S. Cl. ................................. 354/139; 354/60 F; 354/149; 354/33
[58] Field of Search ................... 354/27, 32, 33, 60 F, 354/126, 129, 139, 149

[56] References Cited

U.S. PATENT DOCUMENTS 4,016,575  4/1977  Uchiyama et al. .................. 354/149

FOREIGN PATENT DOCUMENTS 51-119226  10/1976  Japan .

Primary Examiner—Russell E. Adams
Attorney, Agent, or Firm—Weinstein & Sutton

[57] ABSTRACT

Apparatus for automatically synchronizing a camera with an electronic flash is provided in accordance with the teachings of the present invention. The inventive apparatus determines if a photographing mode employing an electronic flash has been established by detecting whether or not a power source of the electronic flash is enabled. Upon a detection of a photographing mode employing an electronic flash, an exposure period synchronized with the operation of the electronic flash is automatically established. However, when no electronic flash is to be utilized, an exposure period appropriate to an automatic photographing mode is established.

8 Claims, 1 Drawing Figure

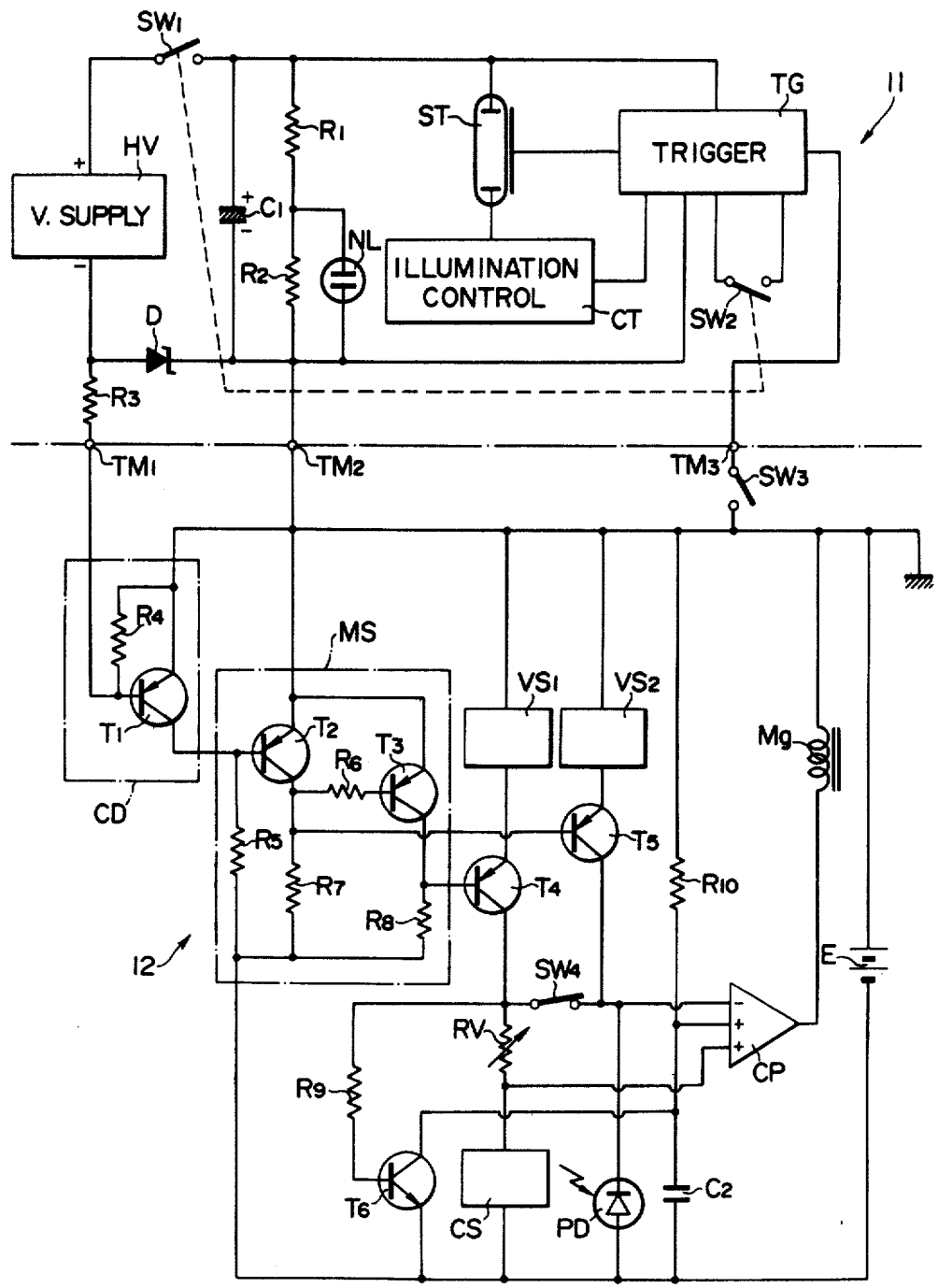

4,298,261

CAMERA AUTOMATICALLY SYNCHRONIZED WITH AN ELECTRONIC FLASH

BACKGROUND OF THE INVENTION

The invention relates to apparatus for automatically synchronizing a camera with an electronic flash, and more particularly, to such apparatus wherein a charging operation within an electronic flash is detected and employed to automatically establish a shutter speed in a camera to be used with the electronic flash.

Cameras are known which are automatically synchronized with an electronic flash to the extent that the shutter speed to be used is automatically changed to a value appropriate for a photographing operation where illumination is supplied from an electronic flash. This is typically done by detecting that the electronic flash, mounted on the camera, is in a condition to operate. In such an arrangement, the photographing mode is automatically changed as a result of the detection of a voltage to which a main capacitor contained in the electronic flash is charged, or by the use of a switch which is mechanically ganged with a power switch of the electronic flash. Both these techniques suffer from a complex circuit arrangement.

SUMMARY OF THE INVENTION

It is an object of the invention to provide apparatus within a camera which acts to shift shutter speed automatically to a value which is appropriate for illumination from an electronic flash, by detecting an operating condition of the electronic flash with a simple circuit arrangement.

In accordance with the teachings of this invention, apparatus for changing the shutter speed of a camera is provided which acts to automatically detect the presence or absence of current flow through an electronic flash circuit as a power switch on the electronic flash unit is activated and to shift the shutter speed of said camera to a value appropriate to a photographing operation wherein illumination is provided by the electronic flash whenever current flow is detected. In this manner, proper shutter speed corresponding to a selected photographing mode is automatically established.

In an exemplary embodiment of the apparatus according to the invention, the current flow through the electronic flash circuit is detected by a transistor to simplify the circuit arrangement.

BRIEF DESCRIPTION OF THE DRAWING

The drawing illustrates an exemplary electric circuit diagram of apparatus according to one embodiment of the invention.

DESCRIPTION OF A PREFERRED EMBODIMENT

Referring to a typical drawing, the electrical circuit for an electronic flash is generally indicated by numeral 11 connected with the automatic synchronizing circuit 12 of a camera having a focal plane shutter and including the apparatus of the present invention. Connection of the circuit 11 occurs through a plurality of connection terminals TM1 to TM3. The circuit 11 of the electronic flash is conventional, and comprises high voltage supply HV, power switch SW1 connected to the positive terminal of supply HV, Zener diode D having its anode connected with the negative terminal of the supply HV, and main capacitor C1 connected between the remaining contact of power switch SW1 and the cathode of Zener diode D. Shunted across main capacitor C1 are resistors R1 and R2 which are connected in series; a second series circuit including flash discharge tube ST and illumination control circuit CT; and trigger circuit TG. Resistor R2 is shunted by neon lamp NL and a resistor R3 is connected between the negative terminal of the supply and terminal TM1. In addition, the circuit includes switch SW2 which is mechanically ganged with power switch SW1 and connected with trigger circuit TG, as shown. The trigger circuit TG is connected with the trigger electrode of discharge tube ST, illumination control circuit CT and terminal TM3. It should also be noted that the cathode of Zener diode D is connected with terminal TM2.

In operation, when the power switch SW1 is closed, the supply HV charges main capacitor C1 through power switch SW1 and Zener diode D. When capacitor C1 is sufficiently charged, a voltage divider formed by resistors R1 and R2 provides an illumination voltage for neon lamp NL, which is thus illuminated, indicating that a flashlight illumination is available for the purpose of taking a picture.

In additon, at the same time as power switch SW1 is closed, switch SW2 which is mechanically ganged thereto is also closed, to enable trigger circuit TG to trigger flash discharge tube ST for producing a flashlight illumination. The purpose of switch SW2 is to prevent an inadvertent flashlight illumination from the electronic flash when it is not being used.

When the circuit 11 is ready to produce a flashlight illumination, trigger circuit TG is rendered operative in response to the connection thereof with the ground through an X camera contact switch SW3 which is provided by the camera at the time when the first shutter blind therein has terminated its run in response to a shutter release initiated by the depression of a shutter button of the camera. Trigger circuit TG produces an illumination signal which is applied to the flash discharge tube ST and the illumination control circuit CT. This triggers the tube ST to produce flashlight illumination. The illumination control circuit CT operates to interrupt the flashlight illumination from tube ST when it detects that a proper exposure has been received at the object being photographed.

The automatic synchronizing circuit 12 provided within the camera in accordance with the teachings of the present invention includes current detector CD, formed by transistor T1 and resistor R4; and a mode switching circuit MS formed by the transistors T2, T3 and the resistors R5 to R8. Transistor T4 has its base connected with the collector of transistor T3, and another transistor T5 has its base connected to the collector of transistor T2. A pair of voltage supplies VS1 and VS2 are connected with the emitters of transistors T4 and T5, respectively. A shutter release switch SW4 is connected across the collectors of transistors T4 and T5. The collector of transistor T4 is connected with one end each of a resistor R9 and a film speed adjusting, variable resistor RV. The other end of resistor R9 is connected with the base of transistor T6 while the other end of variable resistor RV is connected with a constant current source CS. A silicon photodiode PD has its cathode connected with the collector of transistor T5, and has its anode connected with the negative terminal of d.c. source E. A capacitor C2 is connected across the collector and the emitter of transistor T6, and a resistor R10 is connected in series with capacitor C2 across a source E. The junction between capacitor C2 and resistor R10 is connected with a first non-inverting input terminal of a comparator CP. The inverting input terminal of comparator CP is connected with a junction between the collector of transistor T5 and the cathode of the silicon photodiode DP the secondnon-inverting input terminal of the comparator CP is connected with the junction between variable resistor RV and constant current source CS. The output of comparator CP is connected with electromagnet MG, which functions to control the activation of the second shutter blind. The X-contact switch SW3 mentioned above is connected between the grounded positive terminal of source E and terminal TM3. The positive terminal of source E is thus connected with one end of resistor R4, the emitters of transistors T1, T2 and T3, the voltage supplies VS1 and VS2, one end of resistor R10 and electromagnet MG, terminal TM2. The negative terminal of source E is connected with one end each of resistors R5, R7 and R8, the emitter of transistor T6, the other end of constant current source CS, one end of capacitor C2 and the anode of silicon photodiode PD.

The function of current detector CD is to detect any current flow through the circuit 11 as a result of the closure of power switch SW1 thereof. To this end, transistor T1 has it base and emitter connected with terminals TM1 and TM2, respectively, with a protective resistor R4 connected therebetween.

Mode switching circuit MS is responsive to an output signal at the collector of transistor T1 for turning either transistor T2 or T3 on or off to control transistors T4 and T5. Transistor T2 has its base connected with the collector of transistor T1 and its collector connected through resistor R6 with the base of transistor T3. The emitters of both transistors T2 and T3 are connected to the positive terminal of source E. The resistors R5, R7 and R8 are connected to base and the collector of transistor T2 and the collector of transistor T3, respectively.

In operation, when it is desired to take a picture under flashlight illumination from the electronic flash, power switch SW1 of circuit 11 is closed. Under these conditions current flows from high voltage supply HV through switch SW1, main capacitor C1 or series/parallel path including resistors R1, R2 and neon lamp NL, and through Zener diode D to thus develop a voltage across the Zener diode D. This voltage is supplied across the base and the emitter of transistor T1 through resistor R3 and terminals TM1 and TM2, to thereby render transistor T1 conductive. The conduction of transistor T1 acts upon the mode switching circuit MS to turn transistor T2 off and transistor T3 on. This results in transistor T4 being turned off and transistor T5 being turned on. Therefore, the voltage from voltage supply VS2 appears at the collector of transistor T5 and is applied to the base of transistor T6 through a serial path formed by the shutter release switch SW4 and resistor R9 to, thus turn transistor T6 on. The conduction of transistor T6 short-circuits capacitor C2. Under this condition, comparator CP receives the voltage $(-V_{VS2})$ of voltage supply VS2 at its inverting input terminal, and receives the negative voltage $(-V_E)$ of source E at its first non-inverting input terminal through transistor T6. The second non-inverting input terminal of comparator CP receives a voltage corresponding to that of the voltage supply VS2 less the voltage drop across the variable resistor RV due to a currently flow therethrough from current source CS, (i.e. $-V_{VS2}-V_{RV}$). Since the voltages $-V_E$ and $(-V_{VS2}-V_{RV})$ applied to the first and the second non-inverting input terminals are less than the voltage $-V_{VS2}$ applied to the inverting input terminal, comparator CP produces an on output to energize electromagnet MG to prevent the, second shutter blind from being closed.

Upon closure of the power switch SW1 the, main capacitor C1 is also charged from high tension supply HV. When capacitor C1 has accumulated a sufficient charge, the neon lamp NL is illuminated, indicating that a picture can be taken under flashlight illumination.

If the shutter button of the camera is now depressed, shutter release switch SW4 opens, and simultaneously the first shutter blind begins to run. The opening of shutter release switch SW4 interrupts current flow through variable resistor RV, so that the voltage applied to the second non-inverting input terminal of comparator CP due to the low impedance of current source CS, decreases to the negative voltage $(-V_E)$ of source E. At the same time, transistor T6 is turned off, removing a short-circuiting of capacitor C2. Consequently, capacitor C2 begins to charge through resistor R10. The time constant of capacitor C2 and resistor R10 determine a shutter speed or exposure period which is to be used when taking a picture under flashlight illumination from the electronic flash.

As the first shutter blind will have terminated its run, the X-contact switch SW3 of the camera is in a condition under these conditions, closed trigger circuit TG will be driven on to triggering flash discharge tube ST to cause it to produce a flashlight illumination.

As capacitor C2 continues to be charged and the flashlight illumination from tube ST is completed, the voltage applied to the first non-inverting input terminal of comparator CP, connected to the junction between capacitor C2 and resistor R10, will increase above the voltage $(-V_{VS2})$ applied to the inverting input terminal. When this occurs, the comparator CP is turned off to deenergize electromagnet MG to allow the second shutter blind to be closed, thus completing a photographing operation under flashlight illumination from the electronic flash.

From the foregoing description, it will be seen that the mere closure of the power switch SW of the electronic flash is sufficient to automatically establish an exposure period which is synchronized with the operation of the electronic flash.

In an automatic photographing mode, it will be understood that power switch SW1 of the circuit 11 remains open. Thus, no voltage is developed across Zener diode D, and hence transistor T1 in current detector CD remains off. As a consequence, transistor T2 is on while transistor T3 is off. This results in transistor T4 being on and transistor T5 being off. Hence, the voltage $-V_{VS1}$ of voltage supply VS1 appears at the collector of transistor T4. This voltage is supplied to the base of transistor T6 through resistor R9, thus turning it on to short-circuit capacitor C2. Under this condition, the voltage $-V_{VS1}$ of voltage supply VS1 is applied to the inverting input terminal of the comparator CP, the negative voltage $-V_E$ of source E is applied through transistor T6 to the first non-inverting input terminal of comparator CP. The voltage of voltage supply VS1 less the voltage drop across variable resistor RV, due to current flow therethrough attributable to current source CS, namely, $-V_{VS1}-V_{RV}$ is applied to the second non-inverting input terminal. Because the voltages $-V_E$ and $-V_{VS1}-V_{RF}$ applied to the first and the second non-inverting input terminals are lower than the voltage $-V_{VS1}$ applied to the inverting input terminal, comparator CP is turned on to energize electromagnet MG, preventing the second shutter blind from being closed.

If the shutter button of the camera is now depressed, the shutter release switch SW4 opens and the first shutter blind begins to run. When shutter release switch SW4 opens, the voltage applied to the inverting input terminal of comparator CP changes from the voltage $-V_{VS1}$ of voltage supply VS1 which has been supplied through transistor T4 to the voltage to which the junction capacitance of silicon photodiode is charged. This junction capacitance has been charged by voltage supply VS1 and source E. When shutter release switch SW4 is open, the voltage $(-V_{VS1})$ which represents the sum of the voltage $(-V_E)$ of source E and the voltage $(V_E-V_{VS1})$ to which the junction capacitance has been charged is applied to the inverting input terminal of comparator CP. Because the voltages $-V_E$ and $-V_{VS1}-V_{RV}$ applied to the first and the second non-inverting input terminals are lower than the voltage $-V_{VS1}$ applied to the inverting input terminal, comparator CP remains on.

As the shutter is released and the first shutter blind begins to run and, light from an object being photographed passes through the objective lens of the camera and impinges upon silicon photodiode PD. Photodiode PD then produces a photocurrent whose magnitude depends upon the intensity of the incident light which charges the junction capacitance. The voltage applied to the inverting input terminal of comparator CP then begins to decrease from $-V_{VS1}$ as the capacitance is charged by the photocurrent. When the charging proceeds to a point where the voltage applied to the inverting input terminal becomes lower than the voltage $(-V_{VS1}-V_{RV})$ applied to the second non-inverting input terminal, comparator CP switches off to deenergize electromagnet MG allowing the second shutter blind to be closed.

In this manner, during an automatic photographing mode, silicon photodiode PD produces a photocurrent in accordance with the intensity of light from an object being photographed, and this photocurrent charges the junction capacitance of diode PD to establish a proper exposure period automatically.

What is claimed is:

1. Apparatus for automatically synchronizing a camera having an electrical shutter and an automatic photographing mode of operation with an electronic flash energized as a function of accumulated charging current, said apparatus comprising:
    switching means for selectively establishing first and second exposure modes for said camera, one of said exposure modes automatically establishing an exposure period for said electrical shutter commensurate with and synchronized to the operation of said electronic flash and another of said exposure modes establishing an exposure period appropriate to an automatic photographing mode of operation of said camera; and
    means for detecting the initiation of charging current being applied to a main charging capacitor of said electronic flash and providing an output signal indicative thereof, said switching means being responsive to said output signal to automatically establish one of said first and second exposure modes for said camera.

2. The apparatus according to claim 1 wherein said electronic flash includes said main capacitor, a voltage supply and a Zener diode interconnected to form a charging circuit, said means for detecting being responsive to a voltage developed across the Zener diode.

3. The apparatus according to claim 2 wherein said means for detecting comprises transistor means having base and emitter electrode responsive to a voltage developed across said Zener diode, and a resistor connected across said base and emitter electrodes of said transistor means.

4. The apparatus according to claim 2 wherein said electronic flash includes an on-off switch and said means for detecting is operable to detect current flow in said charging circuit of said electronic flash in response to said on-off switch of said electronic flash being placed in an on condition.

5. The apparatus according to claim 1 wherein said switching means comprises a mode switching circuit and first and second circuit means for establishing exposure periods, said mode switching circuit being responsive to said output signal from said detector means to selectively establish said first and second modes, said first circuit means acting to establish an exposure period for said electrical shutter commensurate with said operation of said electronic flash whenever said mode switching circuit has established said first mode, and said second circuit means acting to establish an exposure period corresponding to an automatic photographing mode whenever said mode switching circuit has established said second mode.

6. The apparatus according to claim 5 wherein said switching circuit comprises a first transistor connected to receive said output of said detector means, and a second transistor connected to said first transistor through a resistor, said first and second transistors producing a pair of output signals.

7. The apparatus according to claim 5 additionally comprising comparator means having at least inverting and non-inverting input terminals and a resistor and capacitor connected to form a time constant network connected to said non-inverting input terminal of said comparator, said first circuit means including means for selectively applying a reference potential to said inverting input terminal of said comparator means in response to an establishment of said first mode by said mode switching circuit and transistor means for maintaining said capacitor within said time constant network short-circuit until the instant of shutter release within said camera.

8. The apparatus according to claim 5 additionally comprising comparator means having an inverting input terminal and first and second non-inverting input terminals, a silicon photodiode connected to the inverting input terminal of said comparator means, said silicon photodiode exhibiting junction capacitance and disposed to receive a light input from an object being photographed and to produce photocurrent in reponse thereto and means for applying a reference voltage proportional to a film speed to said second non-inverting input terminal of the comparator, said second circuit means including means for selectively applying a reference potential to said silicon photodiode in response to an establishment of said second mode by said mode switching circuit until the instant of release within said camera.

* * * * *